Figure 1:
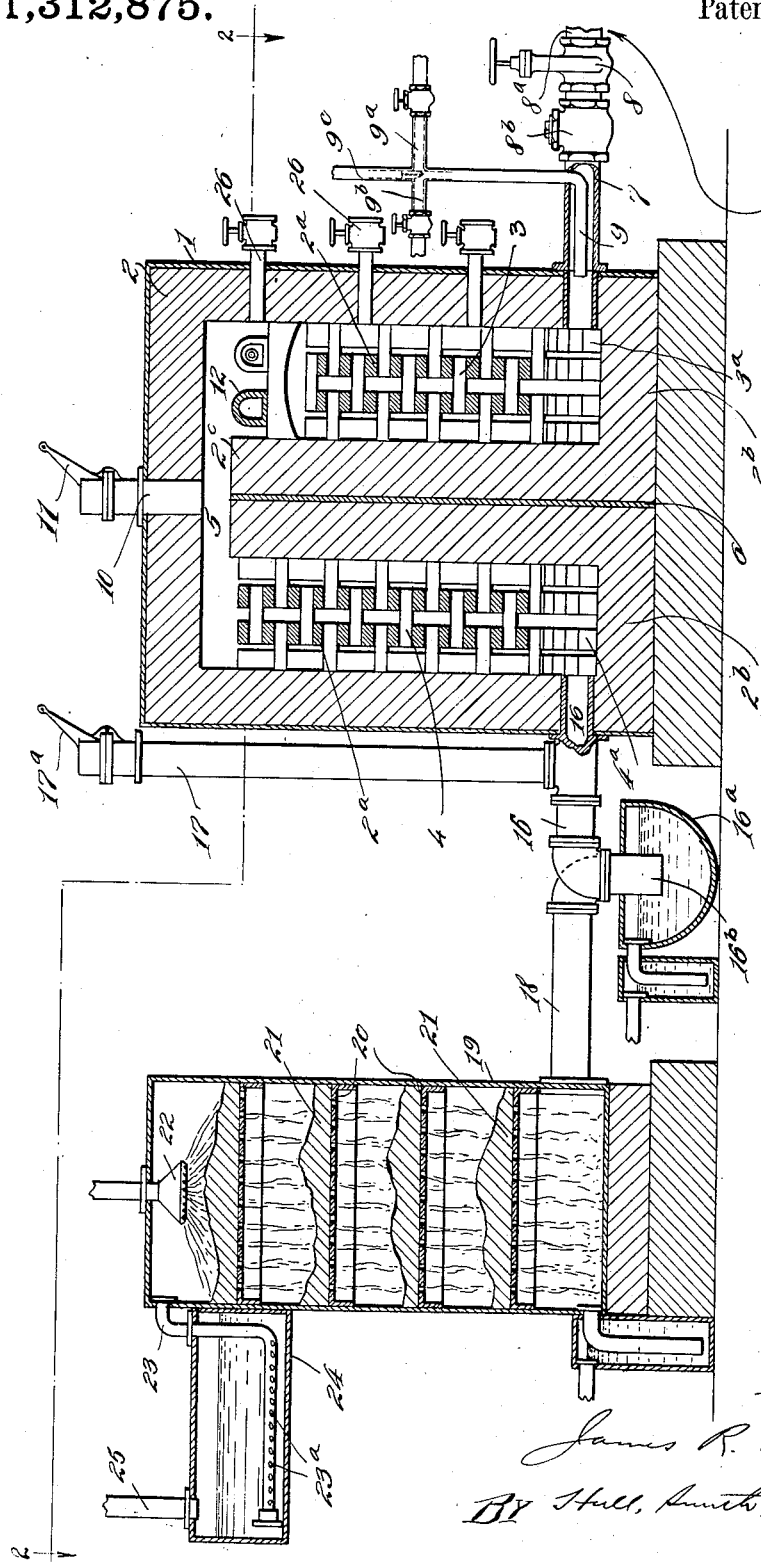

J. R. ROSE.
APPARATUS FOR PRODUCING COMBUSTIBLE FUEL.
APPLICATION FILED DEC. 9, 1915.

1,312,875. Patented Aug. 12, 1919.
2 SHEETS—SHEET 1.

INVENTOR,
James R. Rose,
By Hull, Smith, Buck & West
Attys.

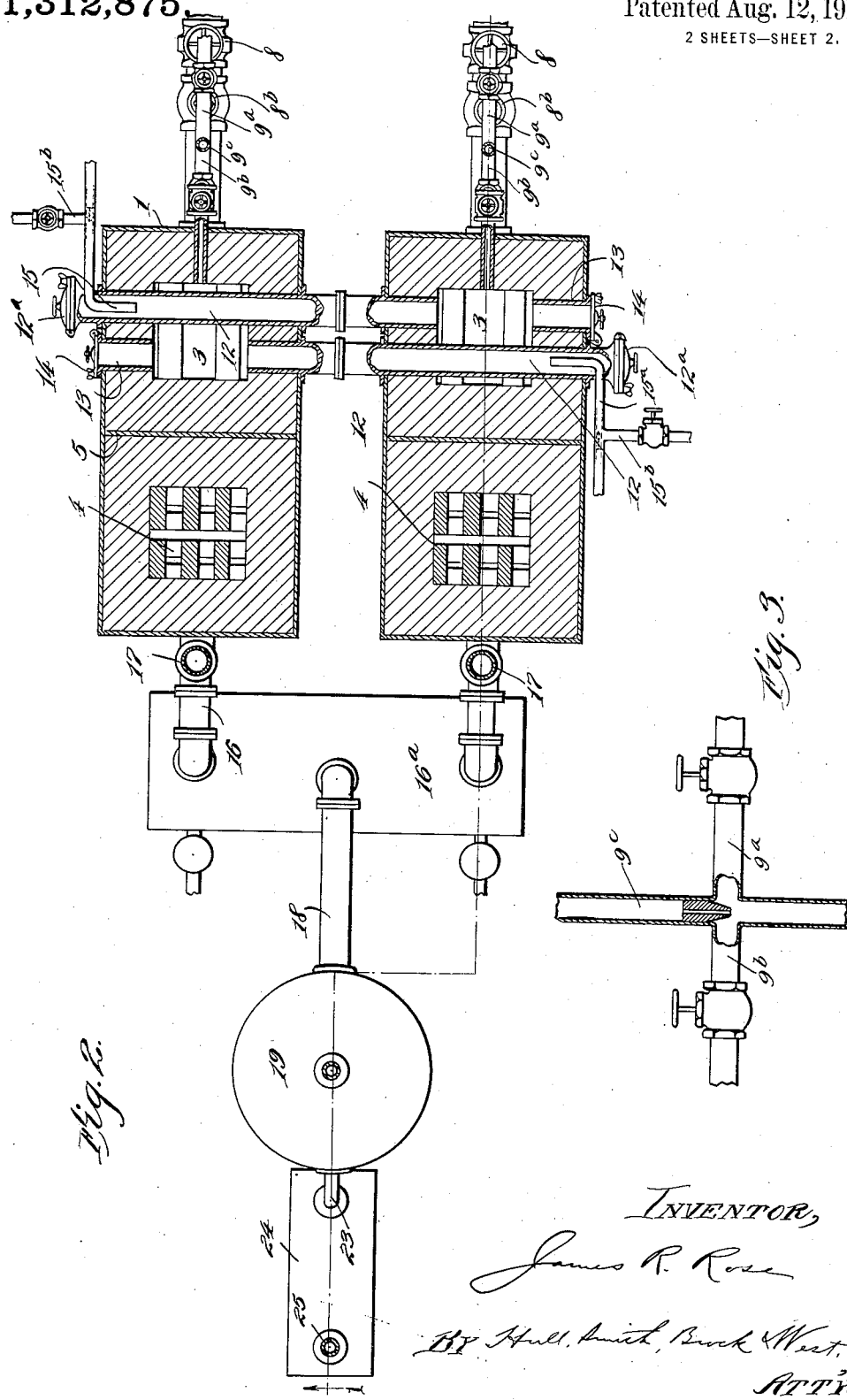

UNITED STATES PATENT OFFICE.

JAMES R. ROSE, OF EDGEWORTH, PENNSYLVANIA.

APPARATUS FOR PRODUCING COMBUSTIBLE FUEL.

1,312,875.  Specification of Letters Patent.  Patented Aug. 12, 1919.

Application filed December 9, 1915. Serial No. 65,954.

*To all whom it may concern:*

Be it known that I, JAMES R. ROSE, a citizen of the United States, residing at Edgeworth, in the county of Allegheny and State of Pennsylvania, have invented a certain new and useful Improvement in Apparatus for Producing Combustible Fuel, of which the following is a full, clear, and exact description, reference being had to the accompanying drawings.

This invention relates to an apparatus for manufacturing gaseous fuel, and more particularly to an apparatus for the production and enriching of gaseous fuel thereby to render it suitable for the cutting and welding art.

A general object of the invention is to provide an apparatus for the production of a fuel which shall possess a higher efficiency than those which have been ordinarily employed heretofore, and more specifically one which shall contain a relatively large proportion of the higher and richer members of the hydrocarbon series, resulting in the production of a gas of high heating value.

A further object of the invention is to provide an apparatus whereby such gaseous fuel may be conveniently, efficiently, and expeditiously produced.

In order to explain but without limiting my invention I have illustrated one operative construction wherein my invention can be embodied in the drawings forming a part hereof, wherein Figure 1 represents a longitudinal sectional view corresponding substantially to the line 1—1 of Fig. 2, Fig. 2 is a horizontal sectional view corresponding substantially to the line 2—2 of Fig. 1, some of the parts being shown in elevation; and Fig. 3 is a detail in elevation of the connections for supplying fluids to the generators.

The apparatus illustrated herein comprises a pair of generators, each preferably shown as rectangular in outline and each having connections for supplying thereto a preheating fluid or fluids as well as a fluid or fluids to be enriched, with a retort located in the upper portion of each generator and arranged to discharge into the upper part of the other generator, whereby each generator may serve as a means for producing an additional enriching fluid to be supplied to the other. As these generators are identical in construction, the corresponding parts thereof will be indicated by like reference characters.

Describing such parts by reference characters, 1 denotes the outer shell and 2 the refractory lining of a generator. This refractory lining may be of any suitable well known material; and each generator is so constructed as to provide a front flue or chamber 3 and a rear flue or chamber 4, said flues or chambers communicating at their upper ends by means of a transverse flue or passageway 5. Refractory material $2^a$ is arranged within the chambers 3 and 4, in "checker-work" formation; and the bottoms of the flues or chambers 3 and 4 are located at a sufficient distance above the bottom of each generator body as to provide an ample thickness of refractory material $2^b$ below such chambers.

6 denotes a partition, preferably of sheet steel, which extends transversely across each generator between the chambers 3 and 4 and which also extends from the bottom of the generator upwardly to the top of the refractory dividing wall $2^c$ between such chambers. This partition prevents the seepage of gases from the chamber or flue on one side thereof to the chamber or flue on the opposite side thereof.

7 denotes an inlet connection pipe communicating with the front or charging wall of each generator and discharging into the bottom of the chamber 3, beneath the arch $3^a$. This connection is provided with a gate valve 8 and is extended from such valve, as indicated at $8^a$, to a suitable air blower (not shown). 9 denotes a nozzle extending into the pipe 7 in front of the check valve $8^b$ and through which a suitable preheating fluid may be introduced into the bottom of the chamber 3 beneath the arch $3^a$. This nozzle preferably extends axially into the connection 9 and is adapted to receive a preheating fluid, such as hydrogen (or some suitable gaseous or liquid hydrocarbon) and to supply the same, commingled with air conducted through the connection $8^a$.

The flue 5 is provided with an outlet connection 10 having a weighted blow-off or pressure relief valve therein, the operating handle for such valve being indicated at 11. A retort 12 is supported in the upper end of the flue 3 of each generator and extends across and through the refractory material 2 of the other generator, discharging into the upper part of the chamber 3 thereof. On the opposite side of each chamber 3 from that into which the retort discharges, there is located a connection 13 having a suitable door or gate 14, whereby access may be had to the upper end of such chamber 3 and to the opposed discharge end of the retort. Each retort is provided with a nozzle 15 discharging axially thereinto and at one side of the chamber 3, such nozzle being conveniently provided on the end of a pipe $15^a$. This pipe may conduct superheated or dried steam to the nozzle and be used for the purpose of injecting liquid hydrocarbon, supplied through a suitably connected pipe, such as the pipe $15^b$. Each retort extends through the outer wall of its respective generator and is there provided with a suitable door or closure $12^a$.

From the arch $4^a$ at the bottom of each chamber 4 there extends an outlet flue 16 the discharge end whereof projects downwardly into a receptacle $16^a$, as shown at $16^b$, the lower end of such flue being sealed by the liquid within the receptacle. Projecting upwardly from each outlet flue 16 is a pipe 17 having a pressure relief valve therein similar to the valve in the flue 10, the operating handle for the valve in each pipe 17 being indicated at $17^a$.

The receptacle $16^a$ preferably extends across the rear ends of both generators and is connected to both generators. From the top of the receptacle $16^a$, and preferably intermediate of the pipes 16, there extends an outlet pipe 18 having its receiving end above the liquid in the tank $16^a$. This pipe 18 communicates with the bottom of the scrubbing tank 19 having a series of transverse perforated partitions 20, said partitions supporting suitable porous material 21, such as pumice stone, the top of the tank 19 being provided with a water-spraying nozzle 22 having the lower end thereof above the uppermost partition and the material thereupon.

From the scrubber a pipe 23 extends into a tank 24 which may contain a hydrocarbon liquid of one of the higher or richer series, the pipe being provided with perforations $23^a$ beneath the top of the liquid in said tank, whereby the gas discharged from the scrubber may be further enriched. From the enriching tank 24 a pipe 25 leads to a suitable storage tank (not shown) or to the point of use.

From the front of the generators there project pipes or projections 26 which provide means for applying pyrometers to the chambers 3 or means for the application of instruments for estimating the temperature in such chambers by observation, as by means of a color test.

In operation, gas (as for instance hydrogen, or artificial or natural gas), may be introduced from the pipe $9^a$ into the connection 7 through the nozzle 9, either with or without liquid hydrocarbon introduced through the pipe $9^b$. This gas, mingled with air supplied through the connection $8^a$, will be introduced into the bottom of the chamber 3. If desired, steam and liquid hydrocarbon may be added to this mixture, the same being supplied through the pipe $9^c$; the mixture in either case being used for the purpose of preheating the chambers 3 and 4. During this preheating operation, the retort 12, which extends across the top of the chamber 3 will be heated and the mixture of liquid hyrocarbon and superheated or dried steam therein; the mixture thus heated will be discharged into the top of the chamber 3 of the adjacent generator. By introducing superheated or dried steam through the pipe $9^c$, no solid carbon will be produced, and hence none will be deposited upon the "checker-work". During this preheating operation, the waste gases may be discharged through the pipe 17 by opening the damper $17^a$. After the preheating operation, hydrogen and liquid hydrocarbon will be injected into the generator by the steam, together with air through the connection $8^a$. The hydrocarbon will be disassociated while rising in the chamber 3 and a partial recombination will occur, the carbon in the hydrocarbon uniting with oxygen from the air, to produce $CO_2$. The gases then encounter those discharged from the retort and this mixture is subjected to an increasing heat to the point of discharge. The result of this action is to produce a hydrocarbon gas of higher heating value than possessed by any of the fluids originally supplied to the generator. The $CO_2$ produced as above described will be recovered in the trap 16, which may, for that purpose, contain a solution of carbonate of soda ($Na_2CO_3$).

By injecting the gas, hydrocarbon, air and steam in the manner described and by adding to this mixture, in the upper part of the chamber 3, the products discharged from the retort which is being heated in the adjacent generator, there will be produced a gas of high heating value of a whole carbon content rich in hydrogen and more economical of production than any of those ordinarily employed in the cutting and welding art.

The arrangement of the furnaces side by side enables me to utilize the waste heat of one generator for the destructive distillation of the hydrocarbon which is to be supplied for the purpose of enriching the gas or gases in the other generator. In operation, while one of these furnaces is preheating, the other will preferably be in operation, and vice versa.

In the operation of my process, the hydrogen which is supplied to the chamber 3 (whether by the pipe $9^a$ or as present in the liquid hydrocarbon) is brought to a nascent condition and, in this condition, combines readily and quickly with the carbon in the gaseous constituent of such liquid fuel as well as with that which is contained within the mixture discharged from the retort. The result is the production of a gas which contains in addition to hydrogen various of the lower members of different hydrocarbon series, mostly but not necessarily of the same series originally introduced into the generator, and this gas may be further enriched by conducting it through the tank 24.

It is here noted that the hydrocarbon liquid introduced into the retort is preferably a heavier hydrocarbon than the hydrocarbon liquid or gas supplied to the chamber 3 therebeneath.

The temperature to which the refractory material $2^a$ will be heated by the operation of "blowing-up" or preheating may be as high as 3000° F. and is generally no lower than 2200° F. By increasing the temperature above 2200° F. the proportion of the hydrogen constituent of the gas ultimately produced will be correspondingly increased and the proportion of the hydrogen constituent of such gas will be correspondingly decreased.

Having thus described my invention, what I claim is:—

1. An apparatus of the character described comprising a pair of generators, means for supplying a preheating fluid or fluids to each of said generators, a retort in each of said generators arranged to discharge into the other generator, and connections whereby gas-producing material may be supplied to said retort.

2. In an apparatus of the character described, the combination of a pair of generators, each having a front and a rear chamber, connections for supplying a preheating fluid or fluids to a front chamber of each generator, and a retort near the upper end of the front chamber of each generator and arranged to discharge into the corresponding part of the front chamber of the other generator.

3. In an apparatus of the character described, the combination of a pair of generators, each having a pair of chambers, connections for supplying a preheating fluid or fluids to one of the chambers of each generator, and a retort near the discharge end of such chamber of each generator and arranged to discharge into the corresponding part of the like chamber of the other generator.

4. In an apparatus of the character described, the combination of a pair of generators each having an elongated flue provided with refractory material therein, means for preheating such material, connections for supplying combustible fluid to each of said flues, and a retort in the flue of each generator and arranged to discharge gaseous contents into the flue of the other generator.

5. In an apparatus of the character described, the combination of a pair of generators each having an elongated flue provided with refractory material arranged to provide a tortuous passageway, connections for supplying combustible fluid to the flue of each generator for the purpose of preheating such refractory material, and a retort in each generator arranged to supply gaseous fuel into the flue of the other generator.

6. In an apparatus of the character described, the combination of a pair of generators each having a front and a rear chamber and a flue connecting said chambers, means for supplying combustible fluid to the bottom of the front chamber of each generator, a retort in the upper portion of the front chamber of each generator and extending into the corresponding part of the front chamber of the other generator, and an outlet connection extending from the rear flue of each generator.

7. In an apparatus of the character described, the combination of a pair of generators each having a front and a rear chamber and a flue connecting said chambers, means for supplying combustible fluid to the bottom of the front chamber of each generator, a retort in the upper portion of the front chamber of each generator and extending into the corresponding part on the front chamber of the other generator, and an outlet connection extending from the bottom of the rear flue of each generator.

8. In an apparatus of the character described, the combination of a pair of generators each having a vertical flue provided with refractory material, a chamber in front of such flue and a flue connecting the first mentioned flue with its chamber, and a retort in the front chamber of each generator extending into and arranged to discharge within the front chamber of the other generator.

9. In an apparatus of the character described, the combination of a pair of generators arranged side by side and each having a vertical flue having refractory material therein, a chamber in front of said flue and a flue connecting said chamber with the first mentioned flue, and a pair of retorts each mounted in the front chambers of both pair of generators.

In testimony whereof, I hereunto affix my signature.

JAMES R. ROSE.

Witness:
N. I. McFARLAND.